United States Patent

Murphy

Patent Number: 5,480,164
Date of Patent: Jan. 2, 1996

[54] DEAD LENGTH COLLET CHUCK HOLDER

[76] Inventor: William G. Murphy, P.O. Box 2799, Corona, Calif. 91718

[21] Appl. No.: 344,142
[22] Filed: Nov. 23, 1994
[51] Int. Cl.⁶ ................................................ B23B 31/20
[52] U.S. Cl. .................................................. 279/50
[58] Field of Search ............................ 279/4.07, 4.09, 279/47, 48, 50, 43, 51, 57, 146, 110; 82/142, 147

[56] References Cited

U.S. PATENT DOCUMENTS

| 628,730 | 7/1899 | Whitney et al. | 279/146 |
| 2,415,482 | 2/1947 | Greenough | 279/54 |
| 2,466,651 | 4/1949 | Zagar | 279/146 |
| 4,121,848 | 10/1978 | Morawski | 279/110 |
| 4,690,415 | 9/1987 | Holdridge | 279/43 |

Primary Examiner—Steven C. Bishop
Attorney, Agent, or Firm—Gilbert Kivenson

[57] ABSTRACT

A collet chuck holder is described in which a standard collet is threaded into a retaining ring which is firmly fastened to the inside of a chuck body. A push tube inside the chuck is joined by bolts to a closing sleeve which surrounds the collet; these bolts pass through oversize holes in the collet retaining ring so that forces exerted by the push tube affect only the closing ring and are not transferred to the collet retaining ring. Unlike the draw bar action normally applied to collet operation, there is no axial displacement of the workpiece. This feature is useful where axial displacement would cause errors in the machining operation.

3 Claims, 2 Drawing Sheets

DEAD LENGTH COLLET CHUCK HOLDER

INTRODUCTION

The present invention relates to a collet chuck holder mechanism which allows the chuck to be opened and closed without lateral motion. Although collet chucks are universally employed because of their speed and precision, they have the disadvantage of being dependent on a draw tube which pulls the collet jaws into a conically tapered, surrounding cylinder. This forces the jaws to close on the work being held. When the draw bar action is reversed to release the workpiece, there is an axial motion when the jaws spring apart. This results in an axial displacement of the work, a situation which requires compensation in automatic, multi-operation machines such as CNC lathes, for example. Compensation systems are costly and add complexity to an already complex mechanism.

Attempts have been made in the prior art to stabilize the axial position of the work in collet type chucks. Morawski et al (U.S. Pat. No. 4,540,187) use internally activated jaws which spread out against hollow workpieces. The work moves very little in an axial direction with the clamping and unclamping of the collet. The workpiece must be hollow, however, and be tapered on part of its outside surface. After the machining operation, the tapered section must be cut away from the useable part of the work. In another patent (U.S. Pat. No. 4,416,459) Morawski employs two sets of collet jaws to hold each workpiece. The jaws of each set are coupled to corresponding jaws in the other so that axial motion of the work is reduced during the opening-closing sequence.

A chuck manufactured by Microcentric Corporation of 25 Terminal Drive, Plainview, N.Y. applies a pushing force to close the jaws of its collet instead of the drawing action of conventional collet chucks. This eliminates axial creep of the work during clamping and unclamping. The collet jaws however must be specially manufactured; they employ rubber segments between the jaws to cause them to spring back when pressure is removed. These collets also employ projections on their inner surfaces to prevent work slippage.

OBJECTIVES

It is one objective of the present invention to confine jaw movement to a radial direction during clamping and unclamping of the workpiece and minimize axial motion. When this is done, a high degree of precision can be achieved.

It is a second objective of the present invention to accommodate standard Hardinge-type collets such as the 5C,3J, 22J,16C and other collets of similar design. In this way the need for special anti-friction inner surfaces and added spring materials (such as rubber inserts) is avoided.

It is a third objective of the present invention to secure the base of a 5C type of collet by its threads while exerting force on the jaws in the direction of the work. In this way the jaws are made to close on the work while not allowing axial movement of the collet or the workpiece.

DESCRIPTION OF THE DRAWINGS

In FIG. 1 some of the clearances between moving and moveable parts has been exaggerated for ease of explanation.

DETAILED DESCRIPTION

Figure 1:
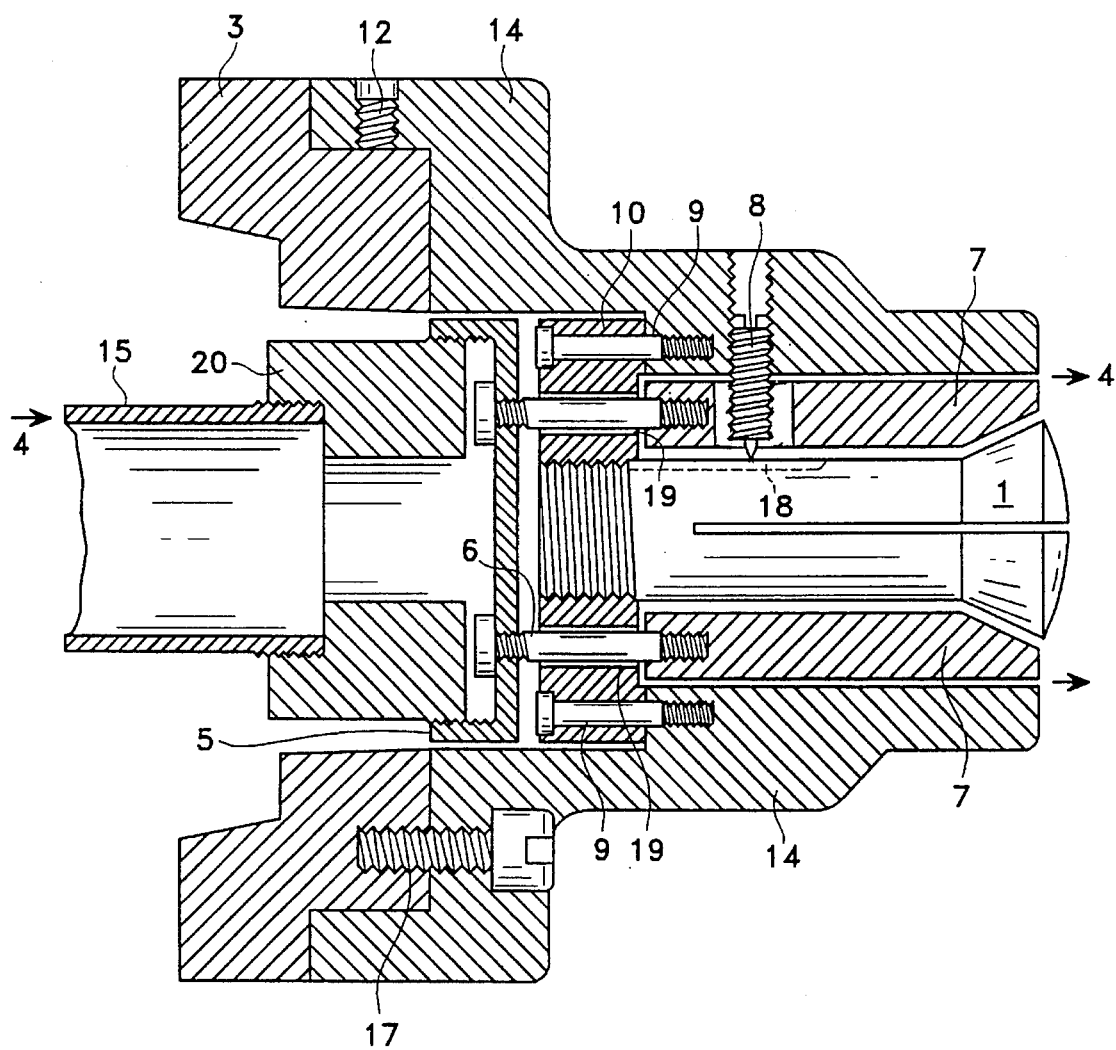
FIG. 1 is a cross sectional representation of the new collet chuck holder.
Figure 2:
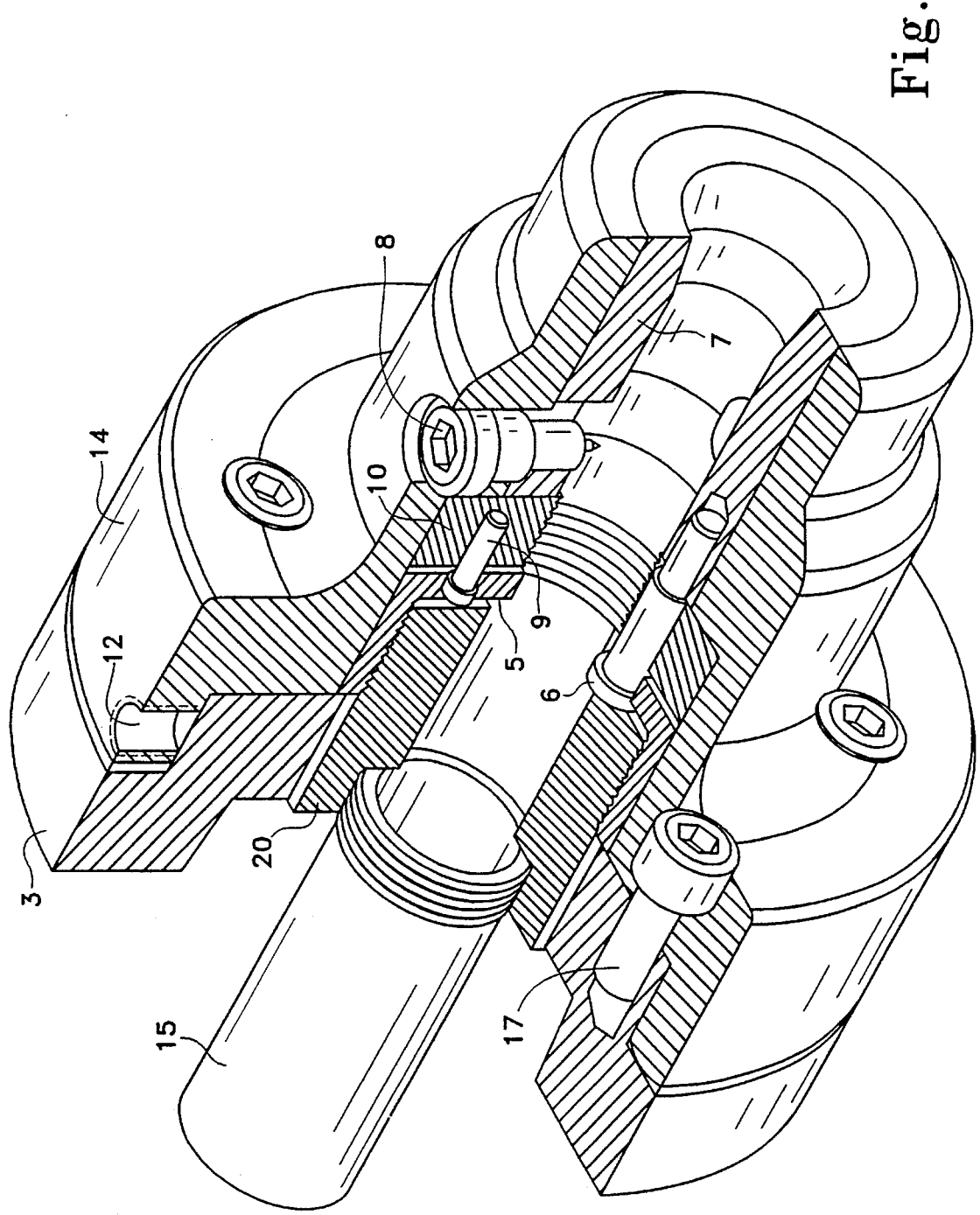
FIG. 2 is a perspective view of the invention with a quarter section cut away inorder to illustrate the operating mechanism.

In FIG. 1 a collet of the 5C type is shown in place. The closing sleeve 7 is moved horizontally in direction 4 to make the collet close. The rear end of the collet is threaded into the collet retaining ring 10 which is held firmly to the chuck body 14 by the bolts 9. An actuator adaptor 20 is threaded internally to receive the pusher tube 15 and externally to thread into the actuator 5. Bolts 6 fasten the actuator to the closing sleeve 7. Bolts 6 are able to slide in the oversize holes 19 so that any motion of actuator 5 is transmitted directly to the closing sleeve 7. Thus a force in direction 4 on the pusher tube results in a radially directed closing force on the jaws of collet 1 (FIGS. 1 and 2). Release of force from pusher tube 15 allows the collet jaws to spring open without lateral movement of work clamped in these jaws.

Bolts 17 join the chuck body 14 to a mounting plate 3 which is mounted on the output shaft of the machine tool. The chuck body is initially trued to the mounting plate 3 by means of the adjusting screws 12 as is known in the art. An anti-rotation set screw 8 in the chuck body makes contact with a key way 18 in collet 1 to prevent turning of the collet with respect to the closing sleeve 7.

The present invention will accommodate the Hardinge 5C collet and can be adapted to use 3J,22J, 16C and similar collets.

Actuation force may be applied to the pusher tube 15 by mechanical, hydraulic and other means known to the art.

What is claimed is:

1. An improved dead length collet chuck holder for preventing edgewise movement of collet jaws while closing containing a collet threaded at one end, a collet retaining ring, a closing sleeve surrounding the collet, a push tube for applying closing pressure to the collet jaws without axial movement of the jaws and an actuator for coupling said push tube to the closing sleeve, the improvement comprising, in part, a series of bolts arranged around a drilled bolt circle in said collet retaining ring with a corresponding series of tapped holes in the interior of the chuck holder whereby the collet is firmly anchored at its threaded end to the collet retaining ring which is then bolted to the chuck body so that the possibility of axial movement of the collet jaws and any workpiece therein is minimized.

2. An improved dead length collet chuck holder as described in claim 1 in which another part of the improvement is comprised of a hollow cylinder threaded at both ends to firmly couple the push tube to said closing sleeve through said actuator thereby further increasing the rigidity of the assembly.

3. An improved dead length collet chuck holder as described in claim 1 in which the collet is prevented from turning during opening and closing of the jaws by a set screw mounted in the body of the holder, said set screw contacting and being slidable in a slot machined in the collet whereby jaw operation is made even more repeatable and precise.

* * * * *